United States Patent [19]

Endress

[11] 3,778,652

[45] Dec. 11, 1973

[54] ROTOR STRUCTURE WITH SQUIRREL CAGE WINDING

[75] Inventor: James W. Endress, Syracuse, N.Y.

[73] Assignee: Carrier Corporation, Syracuse, N.Y.

[22] Filed: Aug. 8, 1972

[21] Appl. No.: 278,847

[52] U.S. Cl.................... 310/211, 310/42, 310/261
[51] Int. Cl. .............................................. H02k 3/06
[58] Field of Search ............ 310/211–213, 261, 42

[56] References Cited
UNITED STATES PATENTS

| | | |
|---|---|---|
| 3,027,474 | 3/1962 | Rosenberry, Jr.................... 310/211 |
| 2,794,138 | 5/1957 | Dunn, Jr............................. 310/211 |
| 2,087,406 | 7/1937 | Hutchins............................ 310/211 |
| 2,370,458 | 2/1945 | Goran................................ 310/211 |
| 2,139,748 | 12/1938 | Harrell............................... 310/211 |
| 2,648,788 | 8/1953 | Fleischer....................... 310/211 X |
| 2,944,171 | 7/1960 | Alger................................. 310/211 |
| 2,971,106 | 2/1961 | Westphalen.................... 310/211 X |

Primary Examiner—J. D. Miller
Assistant Examiner—Mark O. Budd
Attorney—J. Raymond Curtin et al.

[57] ABSTRACT

The laminae or punchings forming the rotor core are arranged in groups in stack formation. All the punchings are of identical shape and are formed with radially disposed slots which are, in the assembled rotor, aligned to form conductor bar receiving slots extending lengthwise of the rotor core. The slot in each punching is formed with an outer narrow portion and an inner wider portion. A projection extends from one side wall of the wide inner portion of the slot toward the opposite side wall thereof. The punchings in certain groups are arranged with the projections therein at one side of the rotor slot. In the intermediate groups, the projections are located at the opposite side of the rotor slot. Such arrangement provides a tortuous passage for reception of cast conductor bars, the projections serving to limit shrinkage of the bar metal in directions lengthwise of the rotor slot and also radially.

2 Claims, 3 Drawing Figures

PATENTED DEC 11 1973

3,778,652

ROTOR STRUCTURE WITH SQUIRREL CAGE WINDING

BACKGROUND OF THE INVENTION

Rotors for induction motors of the type provided with a squirrel cage winding are conventionally formed with aluminum conductor bars cast in slots formed in the rotor. Because aluminum has a coefficient of expansion of approximately twice that of steel, the aluminum conductor bars cast in the iron laminations or punchings of the rotor will, after chilling of the aluminum, be loose in the rotor slots because of shrinkage. Also, during cooling of the aluminum after it has become solidified, the bar is stretched and placed under tension because, in conventional practice, the end rings are cast integral with the bars. Accordingly, the bars are placed under tension and remain under tension at the yield point when the bar has completely cooled. This stretching of the bar takes place at the weakest area, or the area in which the highest stress is concentrated, because of the looseness of the bar in the slot. During operation of the motor, this loose bar, under high stress, can fail from fatigue if vibration is present due to resonance or mechanical force vibration. This invention has as an object an induction motor rotor provided with a squirrel cage winding which embodies a structural arrangement by which contraction of the cast bar, during cooling, is limited, and the tension placed on the bar is uniform over the entire length of the bar.

SUMMARY OF THE INVENTION

The rotor is formed of thin magnetic steel punchings identical in form and shape. The slots in the punchings include projections and the punchings are arranged in groups in stack formation with the projections in the punchings being grouped to provide a tortuous path for reception of the molten metal. The arrangement confines shrinkage of the cast conductor bars to small areas in the rotor slot so the bars are tight in the slots and the stress in the bars is uniform throughout their life.

DESCRIPTION OF THE PREFERRED EMBODIMENT

Figure 1:
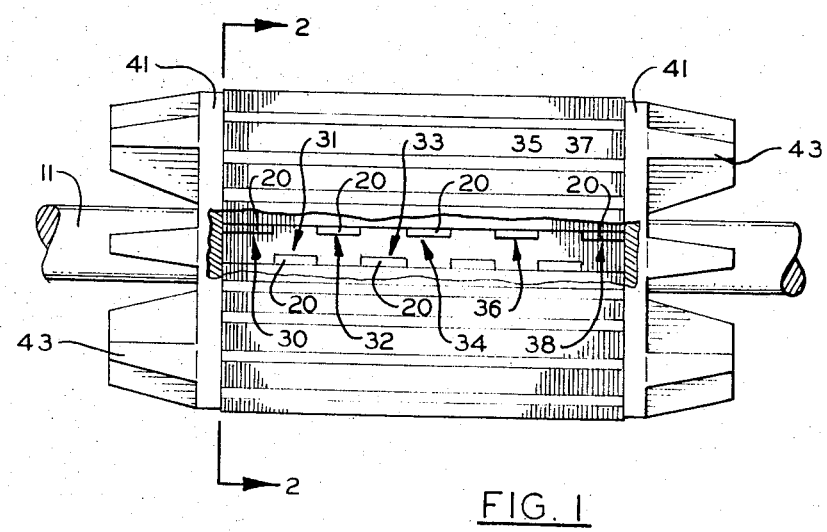
FIG. 1 is a plan view of a rotor embodying my invention, the rotor having a portion in section, the section indicated by the line 1—1, FIG. 2.
Figure 2:
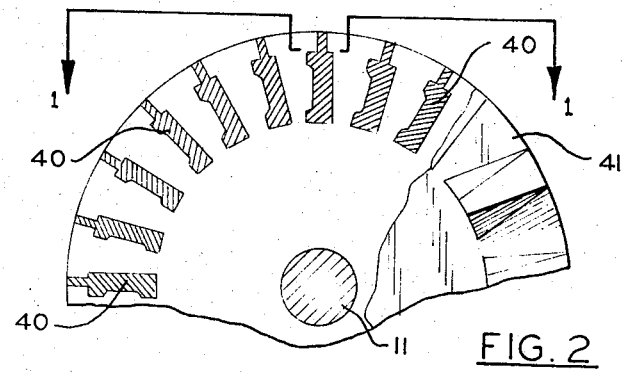
FIG. 2 is a view taken on line 2—2, FIG. 1, the view being in part a sectional view and in part an end elevation of the rotor.

The rotor is formed of a plurality of punchings 10 arranged in stack formation, secured to a shaft 11. All punchings are of identical form and each is produced with a multiplicity of radially disposed slots. Each slot is formed with an outer narrow portion 12 located in the peripheral area of the punching. The main portion of the slot consists of an inner wider portion having side walls 13, 14. The side walls extend between the outer end walls 15, 16 and an inner end wall 17. The side wall 14 of the inner portion of the slot extends uninterrupted from the inner end wall 17 to the outer end wall 15. The side wall 13 is formed with a projection 20 which extends toward the opposite wall 14 a distance less than half the distance between the walls 13, 14. The end edges 21, 22 of the projection 20 converge toward the wall 14 as shown clearly in FIG. 3. The end edges 21, 22 of the projection 20 are arranged in spaced relation to the slot end walls 16, 17.

The punchings are arranged in groups, each containing a plurality of punchings. The group arrangement is shown in FIG. 1, the groups being indicated at 30–38. The projections 20 in groups 30, 32, 34, 36 and 38 are shown in FIG. 1 positioned along the upper side of the rotor slot. The groups 31, 33, 35, and 37, arranged intermediate the even numbered groups, have the projections 20 arranged along the lower side of the rotor slot. This arrangement results in the rotor slot being in the form of a tortuous path extending lengthwise of the rotor.

The conductor bars 40 are cast in the conventional manner by enclosing the stacked rotor in a suitable die structure formed with cavities for producing the short circuiting ring portions 41 and integral fan blades 43, if such are used. The molten metal, usually aluminum, is injected into the rotor slots and die cavities. During cooling of the aluminum, the contraction of the bars in a direction lengthwise of the rotor is mainly confined to the areas between adjacent groups of the punchings. This is because of the contact between the cast bar and the projections 20.

Upon cooling of the aluminum with shrinkage thereof in a direction radially of the rotor, the inclined edges 21, 22 of the projections 20 force the metal toward the straight wall 14. Accordingly, when the metal of the conductor bars is completely cooled, it is tightly engaged between the projections 20 and the walls 14, as well as between the projections 20 in a direction lengthwise of the rotor slot.

Figure 3:
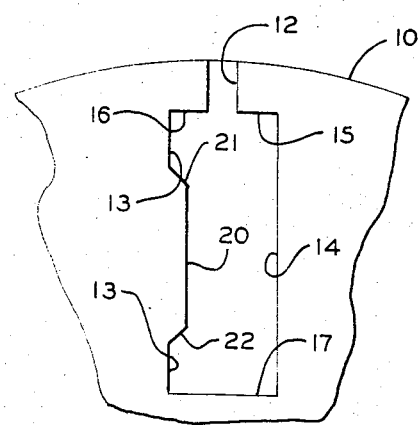
FIG. 3 is an enlarged fragmentary view of a punching showing the formation of one of the slots therein.

In FIGS. 1 and 3, the cast aluminum conductor bars are omitted to better illustrate the formation of the slots in the punchings 10. The projections 20 extend toward the side wall 14 less than one-half of the distance between the walls 13, 14.

It will be readily apparent that the projections 20 in one group of punchings are positioned on the opposite side of the rotor slot relative to the projections 20 in an adjacent group by simply turning one group of punchings over as it is arranged in the stack formation. It follows, therefore, that only one simple form of formation tooling is employed in making the laminae. In other words, the advantages of my invention are obtained without any increase in the production cost of the rotor.

While I have described the preferred embodiments of my invention, it is to be understood that the invention is not limited thereto but may be otherwise embodied within the scope of the following claims.

I claim:

1. A rotor having a squirrel cage winding and comprising a plurality of circular magnetic steel punchings of identical form arranged in groups in stack formation on a shaft, each punching being formed with a circular series of radially disposed slots, said slots being formed with outer narrow portions in the periphery of the punching and with inner wider portions, said inner portions being formed in one side wall thereof with a projection extending transversely of said wider portion toward the opposite side wall thereof and terminating in spaced relation thereto, the end edges of said projection converging toward said opposite side wall, said punchings in said stack formation being arranged with the slots in said punchings forming elongated rotor slots extending lengthwise of the rotor, the punchings in certain of said groups being arranged with said projections positioned at one side of said rotor slot, the punchings in intermediate groups having said projections on the opposite side of said rotor slot, said projections extending toward said opposite side wall a distance less than one-half of the width of said inner wider portion of the slot, and conductor bars cast in said rotor slots.

2. A rotor structure as set forth in claim 1 wherein said inner wider portions of the slots in said punchings are formed with end walls, the end edges of said projections extending in spaced relation to said end walls.

* * * * *